United States Patent [19]
Mepham et al.

[11] Patent Number: 5,311,097
[45] Date of Patent: May 10, 1994

[54] FLUORESCENT LAMP APPARATUS FOR AVIONICS LIQUID CRYSTAL DISPLAYS

[75] Inventors: Thomas A. Mepham, Hiawatha; Roger D. Eller, Cedar Rapids, both of Iowa

[73] Assignee: Rockwell International Corporation, Seal Beach, Calif.

[21] Appl. No.: 846,190

[22] Filed: Mar. 4, 1992

[51] Int. Cl.⁵ .................. H01J 61/35; H01J 61/42; H01J 61/52

[52] U.S. Cl. .................. 313/51; 313/493; 313/607; 313/15; 439/226; 439/236; 439/242

[58] Field of Search .................. 313/51, 493, 15, 607, 313/492, 635; 439/226, 233, 236, 242

[56] References Cited

U.S. PATENT DOCUMENTS

| | | | |
|---|---|---|---|
| 2,515,747 | 7/1950 | Vaughan | 439/242 X |
| 3,649,864 | 3/1972 | Willemsen | 313/635 X |
| 4,080,545 | 3/1978 | Gallo | 313/635 X |
| 4,506,192 | 3/1985 | Koenigsberg et al. | 313/51 X |
| 4,645,974 | 2/1987 | Asai | 313/15 X |
| 5,079,681 | 1/1992 | Baba et al. | 313/15 X |

FOREIGN PATENT DOCUMENTS 584887  1/1947  United Kingdom ................ 439/242

Primary Examiner—Palmer C. DeMeo
Attorney, Agent, or Firm—Gregory G. Williams; M. Lee Murrah; H. Fredrick Hamann

[57] ABSTRACT

An improved avionics fluorescent lamp including a fluorescent tube having a resistive element disposed on its exterior and a terminal block for receiving an inserted fluorescent tube, the terminal block having a semi-rigid electrical contact for contacting the resistive element when the tube is inserted inside the terminal block. A plurality of connectors are disposed on the exterior of the terminal block for providing easy connection between the lamp wiring harness and the filament pins of the fluorescent tube and the resistive element by the semi-rigid connector. And a display device having the fluorescent lamp of the present invention disposed therein where the resistive element is disposed on the reflector side of the tube.

3 Claims, 2 Drawing Sheets

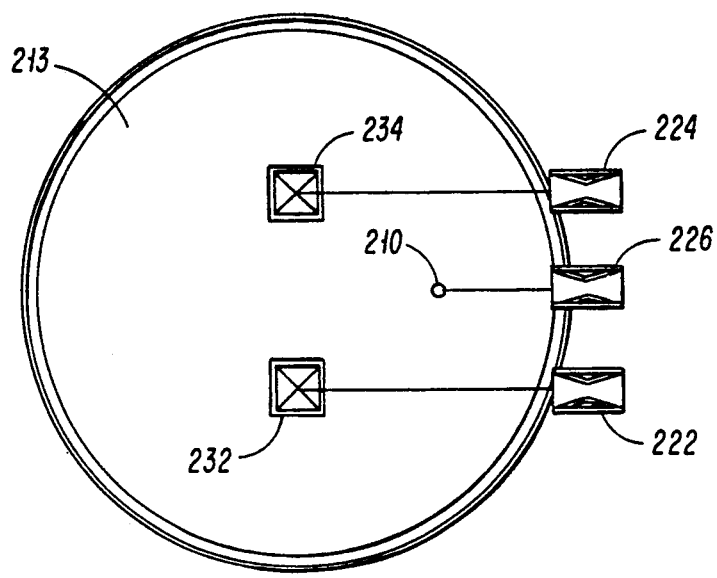
FIG. 4
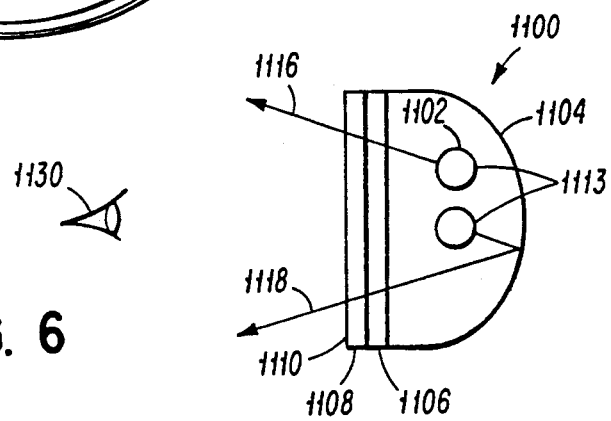
FIG. 6
FIG. 5
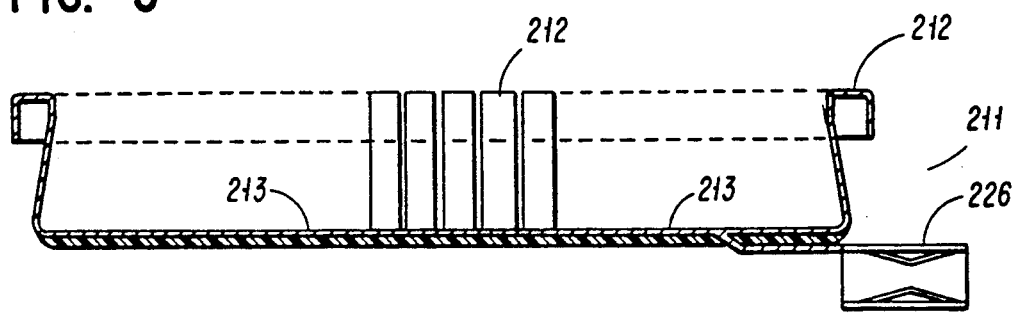

FLUORESCENT LAMP APPARATUS FOR AVIONICS LIQUID CRYSTAL DISPLAYS

BACKGROUND

The present invention generally relates to avionics displays, and more particularly refers to backlighted LCDs, and even more particularly concerns improved fluorescent lamps for backlighted LCD avionics displays.

In today's aviation industry, it is common for an aircraft to be expected to perform in extreme thermal conditions. It is not uncommon for an aircraft to be flying at an altitude of 40,000 feet with an outside temperature of less than minus 40° F. Similarly, it is not uncommon for an aircraft to sit overnight on a cold northern runway One particular problem that must be addressed by avionics engineers is the difficulty in starting fluorescent lamps in extremely low temperatures.

In the past, it has been proposed that the fluorescent lamp tube be heated by running a current through a resistive element or heating wire element around disposed the tube. While this approach has enjoyed some success in the past, it has some drawbacks. Typically, the resistive heating element was wrapped around the outside of the tube and electrically connected to its current source by solder termination. This wire would be grouped with the filament wires of the lamp and together soldered to some wiring harness. Two problems occur in such designs. First of all, the heating element wire may be easily detached, resulting in loss of heating capability. Additionally, the soldering of that wire together with the filament wires results in protracted and labor intensive repair and maintenance practices.

Consequently, there exists a need for improvement in fluorescent lamps and their means for connection with the remainder of the avionics display system.

SUMMARY OF THE INVENTION

It is the object of the present invention to provide an improved fluorescent lamp for avionics displays.

It is a feature of the invention to include a semi-rigid electrical contact between the terminal block and the resistive element on the tube.

It is an advantage of the present invention to increase the reliability of the electrical contact between the resistive element and the remainder of the avionics system wiring.

It is another object of the present invention to provide for decreased maintenance and repair effort for fluorescent tube avionics lamps.

It is another feature of the present invention to include an apparatus for receiving an inserted fluorescent tube having a heater disposed thereon.

It is another advantage of the present invention to provide for plug-in ability for heated fluorescent tubes.

The present invention provides a fluorescent lamp for avionics displays which was designed to satisfy the aforementioned needs, contain the above described features, and produce the previously stated advantages. The invention is a "nonsoldered-heating element" tube in the sense that the heating wire element around the tube and connections to the heating wire element have been eliminated. Instead, a semi-rigid ring including a plurality of semi-rigid fingers serve as electrical connection between the terminal block and the fluorescent tube, which has a resistive element deposited thereon.

Accordingly, the present invention relates to an avionics fluorescent lamp including a fluorescent tube having a resistive element disposed thereon and further having a plurality of electrode pins disposed thereon for connection with an internal filament and a terminal block having a semi-rigid ring comprising a plurality of semi-rigid finger elements for contacting the resistive element when the tube is inserted into the terminal block.

BRIEF DESCRIPTION OF THE DRAWINGS

The invention may be more fully understood by reading the following description of the preferred embodiments of the invention in conjunction with the appended drawings wherein:

FIG. 4 is a bottom view of the contact ring and fluorescent tube combination of the present invention.

FIG. 5 is a cross-sectional representation of the contact ring, of the present invention, for electrically connecting the terminal block with the resistive element disposed upon the fluorescent tube.

FIG. 6 is a cross-sectional representation of the liquid crystal display of the present invention showing the fluorescent tube having a resistive element disposed thereon.

DETAILED DESCRIPTION

Now referring to the figures wherein like numerals therein will refer to like structure therein.

Figure 1:
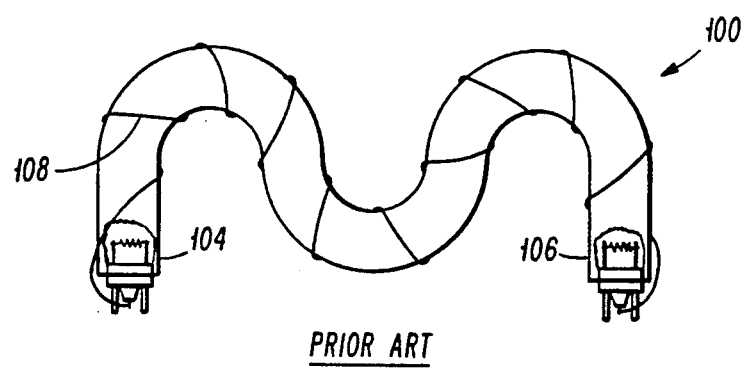
FIG. 1 is a representation of a prior art fluorescent lamp showing a heating wire disposed around the tube.

Now more particularly referring to FIG. 1, there is shown a prior art fluorescent tube assembly generally designated 100 having a fluorescent tube 102 having a first end 104 and a second end 106. Disposed around the tube 102 is a resistive element or heating wire 108 extending from said first end 104 to said second end 106.

Figure 2:
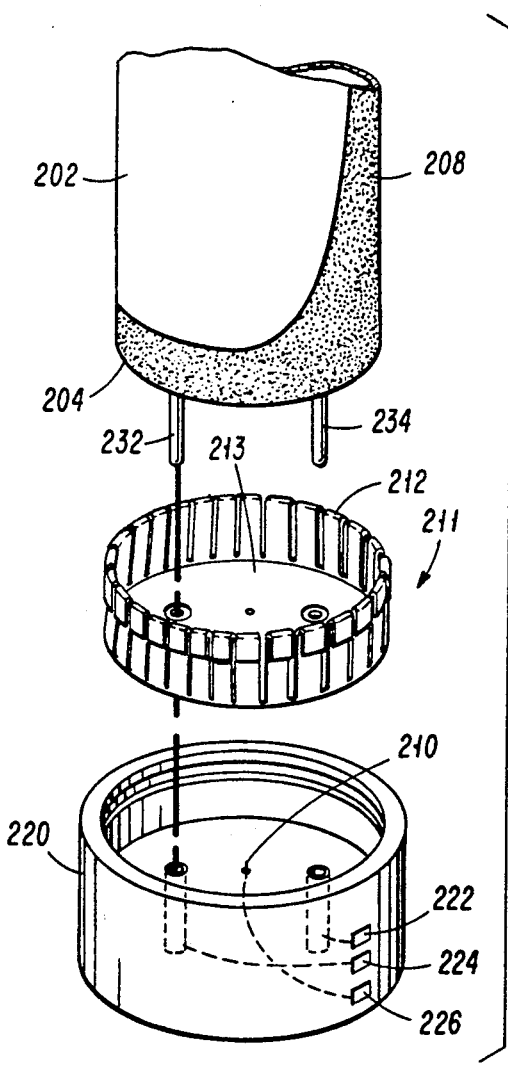
FIG. 2 is an exploded representation of an end of the fluorescent tube of the present invention together with the terminal block assembly of the present invention, showing the semi-rigid electrical contacts in the terminal block.

Now referring to FIG. 2, there is shown the fluorescent tube and terminal block combination of the present invention including a fluorescent tube generally designated 202 having a first end 204 and a resistive element 208 disposed thereon. Resistive element 208 is preferably ITO or similar conductive material. Also shown is semi-rigid contact ring 211 having a plurality of fingers 212 disposed thereon for connection with the resistive element 208 when bulb 20 is inserted into terminal block 220. Contact ring 211 and fingers 212 are preferably Berrillium Copper or similar alloy. Preferably ring 211 is disposed on disk 213 which is a fiberglass or copper coated fiberglass disk. However, any suitable approach to achieve the appropriate circuit connections and isolations may be substituted. Terminal block 220 which is preferably ceramic and is shown having connection points 222, 224 and 226 which are electrically coupled to pin 232, pin 234 and contact 210 respectively when the bulb 202 is inserted in terminal block 220.

Figure 3:
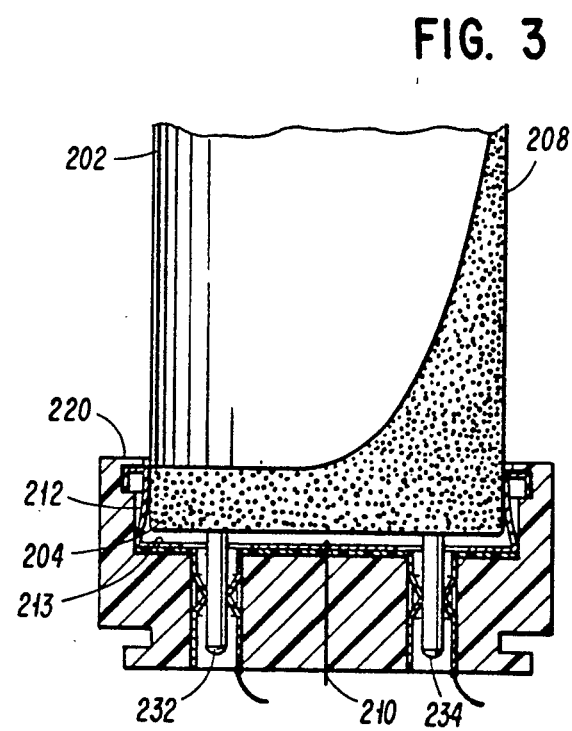
FIG. 3 is a cross-sectional representation of the fluorescent tube and terminal block combination, of the present invention.

A more thorough understanding of the connection between the connectors 222, 224 and 226 with respect to the resistive element 208 and the contact ring 211 can be understood by referring to FIG. 3, which is a cross-sectional view of the tube 202 inserted into the terminal block 220. The contact ring 211 is shown in contact with resistive element 208. The disk 213 forms the bottom interior of the circle formed by the ring 211.

FIG. 4 is a bottom view of the disk 213 of the present invention showing the electrical connections between the tube filament pins and the electrical connector for the resistive element. The electrical connections may be either individual insulated wires or preferably traces on the copper plated disk 213.

Now referring to FIG. 5, there is a cross-sectional view of the semi-rigid contact ring 211 of the present invention showing the plurality of semi-rigid spring fingers 212 for connection with the resistive element when the tube 202 is inserted into the block 220. And also showing disk 213 within ring 211.

Now referring to FIG. 6, there is shown a liquid crystal display device of the present invention, generally designated 1100, having a pair of fluorescent tubes 1102, therein with a resistive element 1113, preferably ITO, deposited on their reflector side. Also shown is reflector 1104, liquid crystal matrix 1106, and face plate 1108 (optional) having front surface 1110. Also shown are representative light rays 1116 and 1118 and viewer 1130.

While particular embodiments of the present invention have been shown and described, it should be clear that changes and modifications may be made to such embodiments without departing from the true scope and spirit of the invention. It is intended that the appended claims cover all such changes and modifications.

We claim:

1. An avionics fluorescent lamp comprising:
  a fluorescent tube having therein a filament having coupled thereto a plurality of filament pins and said tube having an ITO resistive element disposed thereon;
  a terminal block, detachably coupled with and for receiving said fluorescent tube, said terminal block having disposed therein a semi-rigid contact ring having a plurality of semi-rigid fingers coupled thereto, so that, said ITO resistive element touches said semi-rigid fingers when said tube is inserted in said terminal block; and,
  said terminal block having a plurality of block electrical contacts disposed therein for providing electrical connections to an external source and means for providing quick electrical connection between said filament pins and said block electrical contacts.

2. An avionics fluorescent lamp comprising:
  a fluorescent tube having therein a filament having coupled thereto a plurality of filament pins and said tube having a semi-transparent resistive element disposed thereon;
  a terminal block, detachably coupled with and for receiving said fluorescent tube, said terminal block having disposed therein a semi-rigid contact ring having a plurality of semi-rigid fingers coupled thereto, so that, said semi-transparent resistive element touches said semi-rigid fingers when said tube is inserted in said terminal block; and,
  said terminal block having a plurality of block electrical contacts disposed therein for providing electrical connections to an external source and means for providing quick electrical connection between said filament pins and said block electrical contacts.

3. An avionics fluorescent lamp comprising:
  a fluorescent tube having therein a filament having coupled thereto a plurality of filament pins and said tube having a resistive element disposed thereon;
  a terminal block, detachably coupled with and for receiving said fluorescent tube, said terminal block having disposed therein a semi-rigid contact ring having a plurality of semi-rigid fingers coupled thereto, so that, said resistive element touches said semi-rigid fingers when said tube is inserted in said terminal block; and,
  said terminal block having a plurality of block electrical contacts disposed therein for providing electrical connections to an external source and means for providing quick electrical connection between said filament pins and said block electrical contacts.

* * * * *